R. ESNAULT-PELTERIE.
AEROPLANE.
APPLICATION FILED OCT. 19, 1909.

1,040,533.

Patented Oct. 8, 1912.

3 SHEETS—SHEET 1.

WITNESSES:
Fred White
René Bruine

INVENTOR:
Robert Esnault-Pelterie,
By Attorneys,

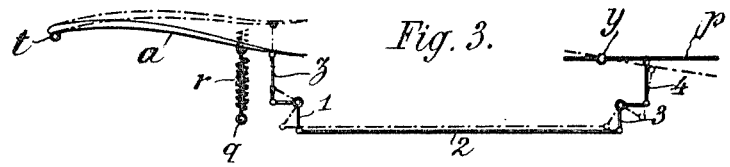
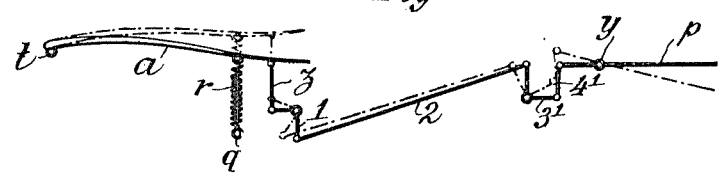
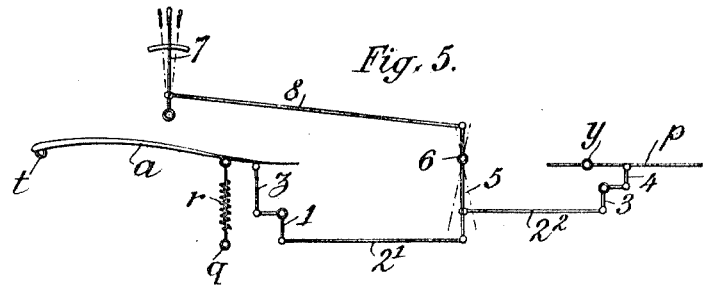
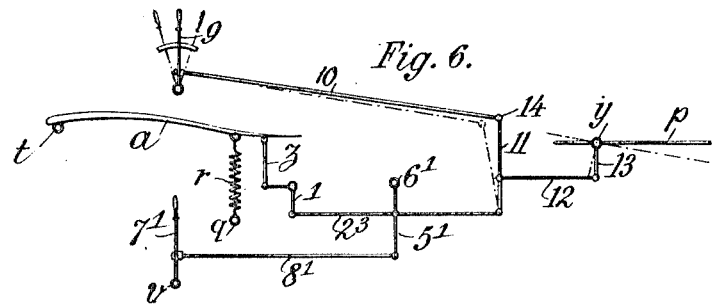
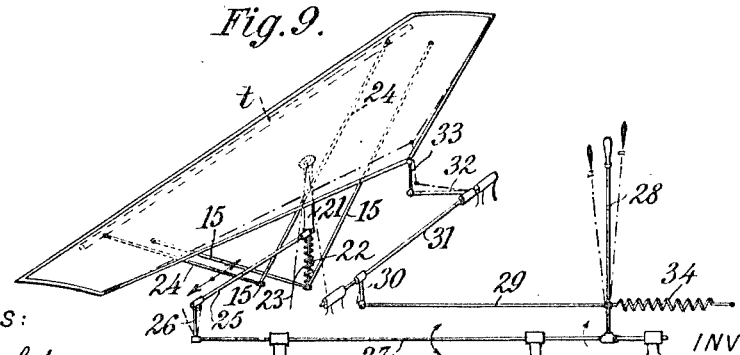

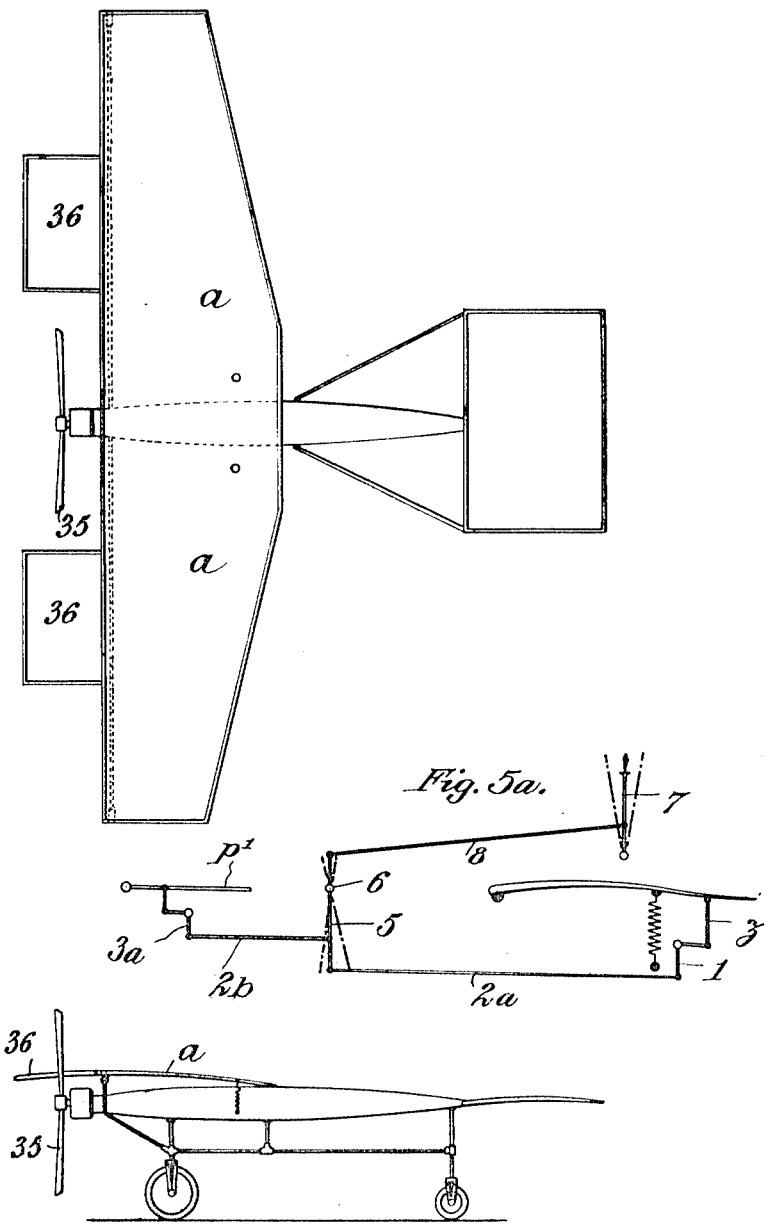

UNITED STATES PATENT OFFICE

ROBERT ESNAULT-PELTERIE, OF BILLANCOURT, FRANCE.

AEROPLANE.

1,040,533.  Specification of Letters Patent.  Patented Oct. 8, 1912.

Application filed October 19, 1909. Serial No. 523,528.

*To all whom it may concern:*

Be it known that I, ROBERT ESNAULT-PELTERIE, a citizen of the Republic of France, residing in Billancourt, Seine, France, have invented certain new and useful Improvements in Aeroplanes, of which the following is a specification.

This invention relates to a novel mode of obtaining longitudinal stability in an aeroplane. The wings are mounted on a transverse shaft so as to be capable of oscillation, and their rear point of attachment is not fixed but is connected with the chassis by a spring of adjustable tension. This spring may be attached to the wing at one end either directly or through a lever of any suitable form, as may be dictated by the particular construction. Moreover, the rear part of the wings or sustaining surfaces, which is attached elastically to the chassis or frame of the apparatus, may be connected with the rear or forward rudder controlling the height of flight or with both these rudders, in such a manner as to insure automatically or at will the longitudinal stability of the apparatus while insuring automatic lifting of the rear part of the wings or sustaining surfaces.

In addition this invention relates to a mode of fixing the wings whereby there is obtained simultaneously a variation, automatically or at will, of their curvature as well as of their incidence. Finally, the sustaining surfaces or wings may be provided on each side of the tractive propeller with two small surfaces forming rudders controlling the height of flight and constituting one piece with the sustaining surfaces or wings which sustaining surfaces are articulated and mounted elastically. When the wings are not flexible they may be provided at the ends with small articulated wings of variable incidence.

The accompanying drawings illustrate the invention.

Figure 1:
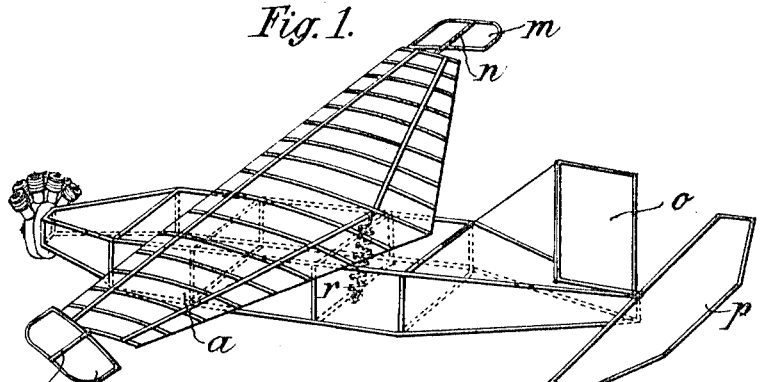
Figure 2:
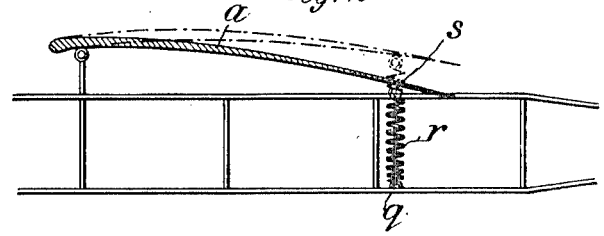
Figure 7:
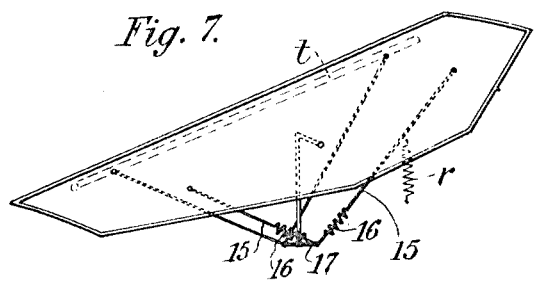
Figure 8:
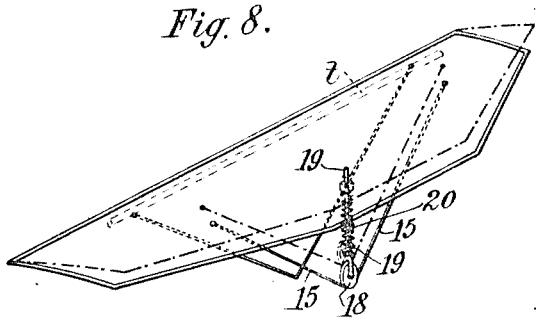

Figure 1 is a perspective view of an aeroplane the sustaining surfaces of which are provided with small wings and are connected elastically with the chassis. Fig. 2 is a side elevation of a part of the aeroplane. Figs. 3, 4, 5, 5ª and 6 are diagrams representing each a modification of the connection of the wings or sustaining surfaces with the forward or rear rudder or tail controlling the height of flight and situated at the rear of the aeroplane, and Figs. 7 and 8 are diagrammatic perspective views showing each a variation of the elastic mounting of the rear part of the sustaining surfaces or wings. Fig. 9 is a diagrammatic perspective view illustrating a mode of attachment of the wings whereby there is obtained simultaneously the automatic or controlled variation of their curvature as well as of their incidence. Figs. 10 and 11 are respectively a plan and a side elevation of a monoplane aeroplane of which the sustaining surfaces comprise two small surfaces, one on each side of the propeller.

Referring to Fig. 1, instead of using sustaining surfaces which are adapted to be flexed, the sustaining surfaces are provided at their far ends with small wings pivoted so as to be of variable incidence; these small wings are under the control of the aeronaut and the vertical rudder controlling the direction of flight is exchanged for a vertical fixed plane. The sustaining surface constituting the wings $a$ carries the small wings $m$, each adapted to turn about a transverse axis $n$ which extends substantially through its center of pressure; these small wings $m$ are for the purpose of restoring transverse equilibrium. They are controlled by varying in inverse directions their angles of incidence by positive rotation of tubes constituting their axes, this rotation being effected through a suitable system of transmission which connects the tubes with the controlling hand lever, not shown in the drawing. The aeroplane shown in Fig. 1 also comprises a fixed vertical plane $o$ at the rear part of the machine and a horizontal rudder $p$, which can be oscillated when necessary in the manner hereinafter described, about two horizontal axes at right angles to each other, for instance by means of a system of universal joints. In this aeroplane the rear point of attachment of the wings to the chassis is not fixed but, as shown in Fig. 2, the attachment is through a spring $r$ connected at one end with the wings $a$ at the point $s$ and at the other end with the chassis at the point $q$; this spring is very flexible and may be attached to the wing either directly, as shown, or through a lever of any suitable form according to the particular construction. Owing to this arrangement, when the aeroplane is in equilibrium in the air and traveling at normal speed, each point of attachment of the wings with the chassis or with the stays is subjected to a constant force; this is particularly true for the point s. It will be supposed that the spring is accurately adjusted so that for the force which is exerted on it it extends by a pre-determined amount corresponding with the desired incidence of the wings. If, in consequence of an atmospheric eddy, an ordinary aeroplane is suddenly plunged into a mass of air moving in an opposite direction to its own, this sudden augmentation of the relative speed will cause the machine to rear and rise, thus producing a sudden and very sensible increase of the sustaining force. In the arrangement described above, on the contrary, if the spring is very long so that its force varies little with the displacements of the point s, the least augmentation of the sustaining force would only have the effect of extending the spring and of automatically diminishing the incidence so that the sustaining force suffers only a negligible alteration and the aeroplane does not pitch; on the contrary when the aeroplane thus rendered stable enters suddenly into a mass of air having relatively less movement, the resistance under its wings has a tendency to diminish and the spring depresses the point s and instantaneously increases the incidence, thus avoiding a sudden descent of the apparatus. This elastic connection of the rear part of the sustaining surfaces necessitates on the one hand a connection between the wings or sustaining surfaces and the rear or forward rudder controlling the height of flight, or with both these rudders, so as to insure automatically or at will the longitudinal stability of the machine.

The wings or sustaining surfaces a are articulated about a horizontal axis t (Fig. 3) at their forward part and their rear part is connected by a spring r with a fixed point q forming, like the shaft constituting the axis t, one piece with the chassis; in this manner the wings can alter their incidence as already indicated. The rear part of the sustaining surfaces a is also connected with the rear rudder or tail p controlling the height of flight which is articulated about a horizontal axis y, the connection being through a system of bell crank levers. This system, as indicated in Fig. 3, comprises a small connecting rod z pivoted to the rear part of the sustaining surfaces a and also to one arm of a bell crank 1 which turns on a pivot fixed on the chassis; the other arm of the bell crank is connected through a link 2 with one arm of a second bell crank 3, the other arm of which is connected by a rod 4 with the said rudder or tail p. The last named connection is at a point to the rear of the axis y. When, in consequence of a squall or an acceleration of speed, the sustaining surface a tends to diminish automatically its angle of incidence by rising at its rear part, the latter exerts a traction on the rod z which determines the turning of cranks 1 and 3 and therefore the descent of the rear part of the rudder p. This change of position is indicated in dotted lines. It will be seen that the displacements of the sustaining surfaces a are in this manner conjoined with the displacements of the rudder p so as to reduce or increase the incidence of the sustaining surfaces while at the same time increasing or diminishing the action of the rudder.

A similar arrangement using a forward rudder is shown in Fig. 5$^a$. The connecting rod z is pivoted to the rear part of the sustaining surface a and to one arm of a bell crank 1 which turns on a pivot fixed to the chassis; while the other arm of the bell crank is connected by a rod 2$^a$ to a lever 5, pivoted at 6 and connected by a rod 8 to the hand lever 7. The lever 5 is connected also by a rod 2$^b$ to a bell crank 3$^a$ which control the forward rudder p'.

In the variation shown in Fig. 4 the connection between the sustaining surfaces a and the rudder p is very similar to that shown in Fig. 3, the only difference being that the rear bell crank 3' is connected by a rod 4' with the front part of the rudder p in front of the axis y and that this rear bell crank is turned through an angle of 90° in relation to the front bell crank 1; this being necessary in order to attain the same relationship between the movements of the surfaces a and the rudder p.

The modification shown in Fig. 5 is the same as that shown in Fig. 3 except that the link 2 of that figure is sub-divided into two parts, 2', 2$^2$, which are pivoted to the same lever 5, turning on a fulcrum 6 and controlled by a hand lever 7 through a connecting rod 8. In this modification in addition to the automatic transmission of the displacements of the sustaining surfaces a to the rudder p it is possible to give like conjoint displacements to a and p by operating the hand lever 7.

In the modification shown in Fig. 6 the system is the same as in Fig. 5 except that there is provided an auxiliary controlling lever 9 connected by a rod 10 with a lever 11 to which is pivoted a connecting rod 12, itself pivoted to an arm 13 fixed to the shaft constituting the axis y, or to the rudder p on the line of this axis. The lever 11 is pivoted to the connecting rod 2$^3$ which is pivoted to the lever 5' turning on the fulcrum 6' and controlled by the lever 7' through the connecting rod 8'. The system constituted by the hand lever 9, connecting rod 10, lever 11, connecting rod 12 and arm 13 is for the purpose of controlling, by means of the lever 9, the relative position of the wings a and of the rudder p by turning the latter only as indicated in dotted lines. For varying conjointly the incidence of the wings *a* and the rudder *p* the hand lever 7' is used, this operating similarly to lever 7 of Fig. 5; in addition there is the same automatic conjoint displacement described with reference to Figs. 3 and 4. It will be obvious that like connections duly modified may be used for controlling also the front rudder when such is used instead of a rear, or for controlling simultaneously the two rudders when both are used.

Instead of connecting rods and bell cranks any other suitable mode of transmission, such as through cords, can be used.

In the system of elastic attachment of the rear part of the wings shown in Fig. 7, not only is the middle point of the rear of the wings attached by a spring *r* to the chassis but the rear stays 15 which control the curvature are provided with springs 16, 16, which are attached to a movable cross bar 17 in such a manner that the stays may extend under the effect of the traction of a gust of wind.

In the modification shown in Fig. 8, the pulley 18 over which the rear cord forming the two rear stays 15 passes is provided with a spring mounting, that is to say the rod 19 which carries it can slide vertically and abuts at its lower part against a helical spring 20 in compression. In this modification the point of attachment of the rear stays 15 rises as shown in dotted lines producing the same effect as that described in the preceding paragraph. Owing to these arrangements not only is the middle of the rear edge of the wings adapted to rise under action of a gust of wind but the whole rear portion.

In Fig. 9 there is pivoted at its upper end to the chassis a hollow rod or sheath 21 in which slides a rod 22 subject to the pressure of a helical spring 23. At the lower part of the rod 22 are attached the ends of two rear stays 15 while the front stays 24 are attached to a fixed point of the chassis. To the rod or sheath 21 is attached a connecting rod 25 pivoted at its other end to an arm 26 fixed to a rocking shaft 27. To the other end of the shaft 27 is fixed a lever 28 mounted to oscillate in the plane of the shaft 27 and to a point of this lever there is pivoted a connecting rod 29 pivoted at the other end to an arm 30 keyed to the rocking shaft 31. The latter carries a second arm 32 connected by rod 33 with the wings. The operation of this system is as follows:—By angularly displacing the lever 28 in the transverse direction so as to rock in one direction or the other the shaft 27, the arm 26 is displaced and there follows a pull or push on the rod 25 which is transmitted to the rod 22 and its sheath 21. Whichever the direction, therefore, the pull is exerted on one of the stays 15 while the other is relaxed, this being independent of the position of the rod 22 in its sheath 21, and consequently there is a variation of curvature in the surface of the wings. This movement in no way prevents the automatic and simultaneous rise of the rear of the two sides of the sustaining surface since the rod 22 is adapted to rise in its sheath 21 under control of spring 23 when there is a sudden pull exerted on the stays 15 due to a gust of wind, for example, on the sustaining surfaces. On the other hand by inclining the lever 28 in the longitudinal plane of the aeroplane, either forward or backward, a lifting or depression of the rear part of the sustaining surface, that is to say a variation of its incidence, may be produced at will.

It is advisable to balance the traction exerted by the sustaining surface on the operating lever 28 by a spring 34 suitably adjusted, and functioning like the spring *r* of the other figures by reason of its connection at one end (through intermediate parts) to the supporting plane and at the other end to the chassis.

As shown in Figs. 10 and 11 there may be provided on each side of the propeller 35 a small plane 36 constituting a rudder controlling the height of flight and made in one piece with the sustaining surfaces *a*.

Having thus described my invention and the best means I know of carrying the same into practical effect, I claim:—

1. An aeroplane comprising a sustaining surface, a shaft transverse to the aeroplane on which the said surface is mounted at its front part to turn, a spring connected at one end with the chassis of the aeroplane and at the other end with the center of the rear part of the said surface.

2. An aeroplane comprising a sustaining surface, a shaft transverse to the aeroplane on which the said surface is mounted at its front part to turn, a lever, and a spring connected at one end with the chassis of the aeroplane and connected at the other end, through said lever, with the rear portion of the said surface.

3. An aeroplane comprising an elastically mounted sustaining surface, a rudder controlling the height of flight and a transmission system adapted to transmit the movements of the sustaining surface to the rudder.

4. An aeroplane comprising an elastically mounted sustaining surface, a forward rudder controlling the height of flight, a rear rudder controlling the height of flight and a system of transmission adapted to transmit the movements of the sustaining surface to the said rudders.

5. An aeroplane comprising a sustaining surface, a rudder, a system of transmission adapted to transmit movements of the sustaining surface to the rudder, a hand lever and a transmitting system adapted to transmit the movements of the said lever to the first-named system of transmission.

6. An aeroplane comprising a sustaining surface, a rudder, a system of transmission adapted to transmit movements of the sustaining surface to the rudder, a hand lever, a transmitting system adapted to transmit the movements of the said lever to the first-named system of transmission and a second lever adapted to displace the said rudder independently of the said sustaining surface.

7. An aeroplane comprising a sustaining surface, stays attached to the rear portion of the said surface, a sheath pivoted to the chassis of the said aeroplane, a spring rod adapted to slide in the said sheath, and a system of transmission adapted to turn the said sheath on its pivot.

8. An aeroplane comprising a sustaining surface, stays attached to the rear portion of the said surface a sheath pivoted to the chassis of the said aeroplane, a spring rod adapted to slide in the said sheath, a system of transmission adapted to turn the said sheath on its pivot, a lever adapted to control the said transmission and a second transmission controlled by the said lever and adapted to control the incidence of the said surface.

In witness whereof, I have hereunto signed my name in the presence of two subscribing witnesses.

ROBERT ESNAULT-PELTERIE.

Witnesses:
  Marcel Armengaud, Jeune,
  H. C. Coxe.